United States Patent
Richardson

Patent Number: 5,253,471
Date of Patent: Oct. 19, 1993

[54] GAS TURBINE ENGINE COMBUSTOR

[75] Inventor: John S. Richardson, Alvaston, England

[73] Assignee: Rolls-Royce plc, London, England

[21] Appl. No.: 729,167

[22] Filed: Jul. 12, 1991

[30] Foreign Application Priority Data

Aug. 16, 1990 [GB] United Kingdom ............ 9018013

[51] Int. Cl.[5] .................................................. F02C 3/06
[52] U.S. Cl. ...................................... 60/39.36; 60/754
[58] Field of Search .................. 60/752, 754, 755, 756, 60/757, 39.36

[56] References Cited

U.S. PATENT DOCUMENTS

| | | | |
|---|---|---|---|
| 4,365,470 | 12/1982 | Matthews et al. | 60/756 |
| 4,380,905 | 4/1983 | Smart et al. | 60/756 |
| 4,934,145 | 6/1990 | Zeisser | 60/756 |

FOREIGN PATENT DOCUMENTS

| | | |
|---|---|---|
| 2152465 | 9/1971 | France . |
| 2312654 | 5/1975 | France . |
| 2410138 | 11/1977 | France . |
| 2624954 | 12/1988 | France . |
| 2635577 | 2/1990 | France . |
| 2637675 | 4/1990 | France . |
| 2044912 | 3/1979 | United Kingdom . |
| 2073398 | 4/1981 | United Kingdom . |

Primary Examiner—Richard A. Bertsch
Assistant Examiner—W. J. Wicker
Attorney, Agent, or Firm—Cushman, Darby & Cushman

[57] ABSTRACT

A gas turbine engine annular combustor having a bulkhead at its upstream which is thermally protected by an annular array of heat shields. Each heat shield is provided with integral flanges which space apart the heat shields and bulkhead to define chambers therebetween. Apertures in the bulkhead direct cooling air into the chambers at positions adjacent the outer peripheries of the heat shields. The cooling air flows generally inwards within each chamber before being exhausted therefrom.

15 Claims, 5 Drawing Sheets

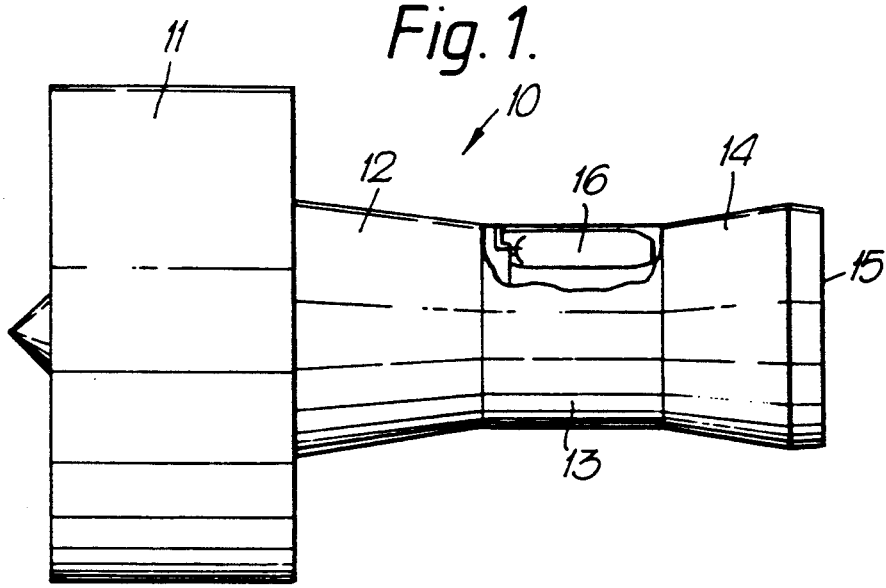
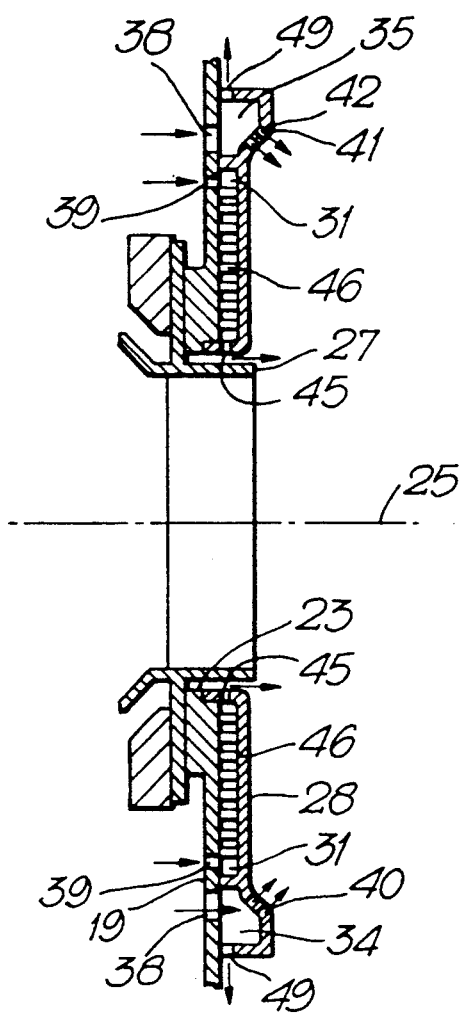

GAS TURBINE ENGINE COMBUSTOR

This invention relates to a gas turbine engine combustor and is particularly concerned with the thermal protection of the wall at the upstream end of an annular combustor.

BACKGROUND OF THE INVENTION

Modern gas turbine engines are commonly provided with a combustor which is of generally annular configuration. Usually a wall or bulkhead is provided at the upstream end of the combustor which is suitably apertured to receive a number of fuel burners. The fuel burners are equally spaced around the bulkhead and direct fuel into the combustor to support combustion therein. The combustor bulkhead is therefore usually close to the high temperature combustion process taking place within the combustor, making it vulnerable to heat damage.

One way of protecting the bulkhead from the direct effects of the combustion process is to position heat shields on its vulnerable parts. Typically each heat shield is associated with a corresponding fuel burner, extending both radially towards the radially inner and outer extents of the bulkhead and circumferentially to abut adjacent heat shields. Each heat shield is spaced apart from the bulkhead so that a narrow space is defined between them. Cooling air is directed into this space in order to provide cooling of the heat shield and so maintain the heat shield and the bulkhead at acceptably low temperatures.

In practice, it has proved to be difficult to ensure that the majority of each of the heat shields remains at an acceptably low temperature without the use of excessive amounts of cooling air. Since the cooling air is normally air which has been compressed by the gas turbine engine's compressor, any excessive use of that air for cooling purposes is undesirable in view of the detrimental effect which this has upon overall engine efficiency.

SUMMARY OF THE INVENTION

It is an object of the present invention to provide a gas turbine engine annular combustor having a bulkhead provided with heat shields which are so configured as to make more effective use of the air which is used to cool them.

According to the present invention, a gas turbine engine annular combustor includes a bulkhead at its upstream end, said bulkhead having a plurality of apertures therein, each aperture being adapted to receive a fuel burner, the longitudinal axes of said apertures constituting generators of a notional or virtual surface of rotation the longitudinal axis of which is coaxial with the longitudinal axis of said combustor, and a plurality of head shields located on the downstream face of said bulkhead so as to provide thermal shielding thereof, each heat shield being associated with a corresponding one of said fuel burner apertures and having a corresponding fuel burner aperture therein, means being provided to space apart each of said heat shields and said bulkhead so that corresponding chambers are defined therebetween, said bulkhead having a plurality of further apertures therein for the direction therethrough of cooling air into said chambers at positions adjacent the outer peripheries of each of said heat shields, means being provided to subdivide each of said chambers so that a portion of said cooling within each chamber flows generally towards a radial plane containing the longitudinal axis of its associated fuel burner aperture and the remainder flows generally towards said notional or virtual surface, means being provided to subsequently exhaust said cooling air from each of said chambers.

BRIEF DESCRIPTION OF THE DRAWINGS

The present invention will now be described, by way of example, with reference to the accompanying drawings in which:

FIG. 1 is a side view of a ducted fan gas turbine engine having a combustor in accordance with the present invention.

FIG. 4 is a view on section line IV—IV of FIG. 3.

DETAILED DESCRIPTION OF THE INVENTION

Figure 2:
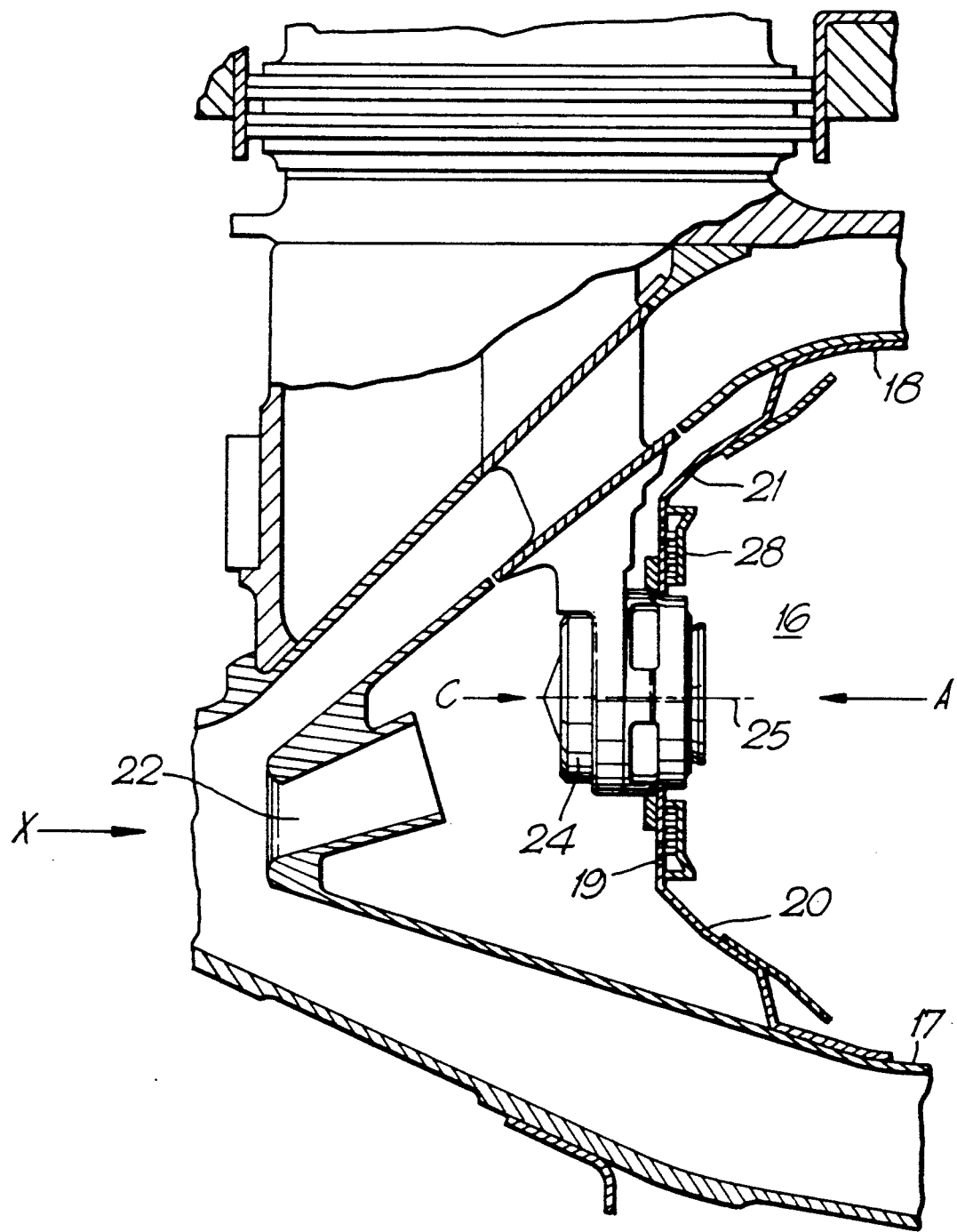
FIG. 2 is a sectioned side view of a portion of the upstream end of a combustor in accordance with the present invention showing one of the fuel burners of that combustor.

Referring to FIG. 1, a ducted fan gas turbine engine generally indicated at 10 is of conventional construction comprising, in axial flow series, a ducted fan 11, compressors 12, combustion equipment 13, turbines 14 and a propulsion nozzle 15. The engine 10 operates in the conventional way so that air compressed by the fan 11 and compressors 12 is mixed with fuel and the mixture combusted in the combustion equipment 13. The resultant combustion products then expand through the turbines 14, which drive the fan 11 and compressors 12, to be exhausted through the propulsion nozzle 15. Propulsive thrust is provided both by the propulsion nozzle 15 exhaust and by part of the air flow exhausted from the fan 11.

The combustion equipment 13 comprises an annular combustor 16, the upstream end of a portion of which can be seen more clearly if reference is now made to FIG. 2. The combustor 16 comprises radially inner and outer annular walls 17 and 18 respectively which are interconnected at their upstream ends by a bulkhead 19, the mid-portion of which is generally planar and radially extending. The radially inner and outer extents 20 and 21 respectively of the bulkhead 19 are configured so as to blend with the combustor walls 17 and 18. The combustor walls 17 and 18 extend upstream o±the bulkhead 19 to define a plurality of air inlets 22. The air inlets 22 are fed with air from the compressors 12 flowing in the general direction indicated by the arrow X.

A plurality of apertures 23 are provided in the bulkhead 19, each one to receive the outlet end of a fuel burner 24. The apertures 23 are equally spaced apart around the bulkhead 19 so that their longitudinal axes 25 constitute generators of a notional substantially cylindrical surface 26. It will be appreciated however, that the aperture longitudinal axes 25 could be inclined so as to be radially outwardly flared. This would result in the notional surface 26 being of substantially frustoconical form.

Figure 3:
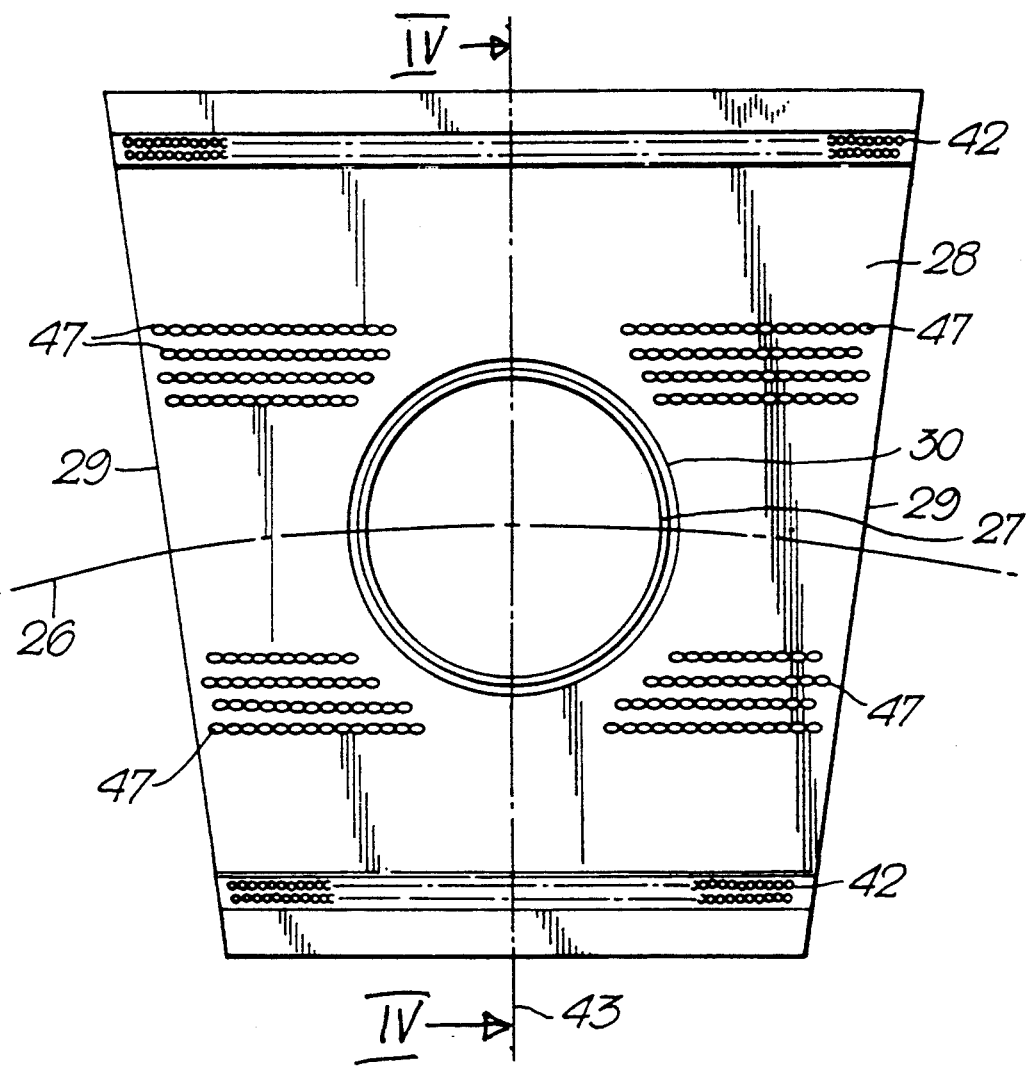
FIG. 3 is a view on arrow A of FIG. 2, of one of the heat shields of the combustor in accordance with the present invention, the fuel burner having been omitted in the interests of clarity.

As can be seen in FIG. 3, the axis of the notional cylindrical surface 26 is coaxial with the longitudinal axis of the combustor 16, which is itself coaxial with the longitudinal axis of the engine 10.

Referring to FIG. 4, an annular seal 27 is interposed between each fuel burner 24 and its corresponding bulkhead aperture 23. The seals 27 ensure that gas leakage between the fuel burners 24 and their apertures 23 is minimised while permitting a limited amount of radial movement between them to take account of problems created by thermal mis-matching.

The bulkhead 19 is particularly vulnerable to overheating resulting from the combustion process which takes place within the combustor 16. In order to provide thermal shielding of the bulkhead 19, a plurality of heat shields 28 are attached to the radially extending part of its downstream face. Four bolts 28a integral with each heat shield 28 facilitate that attachment.

Each heat shield 28 is provided with radially extending edges 29 which abut or are very close to the corresponding edges 29 of adjacent heat shields 28. The heat shields 28 therefore cooperate to define a fully annular shield.

Each heat shield 28 is associated with a corresponding fuel burner aperture 23 and is itself provided with a similar fuel burner aperture 30. Thus as can be seen in FIG. 4, the bulkhead and heat shield apertures 23 and 30 respectively are coaxially aligned to accommodate the seals 27 and in turn the fuel burners 24.

The heat shields 28 are all of similar construction. Consequently they will be described with reference to a single heat shield 28.

The upstream face of the heat shield 28, is spaced apart from the mid-portion of the downstream face of the bulkhead 19 so that a chamber 31 is defined between them. The spacing apart of the bulkhead 19 and heat shield 28 and the definition of the chamber 31 is provided by a number of flanges which are integrally formed on the upstream face of the heat shield 28. It will be appreciated however that some or all of the flanges could alternatively be formed on the downstream face of the bulkhead 19 if so desired.

Figure 5:
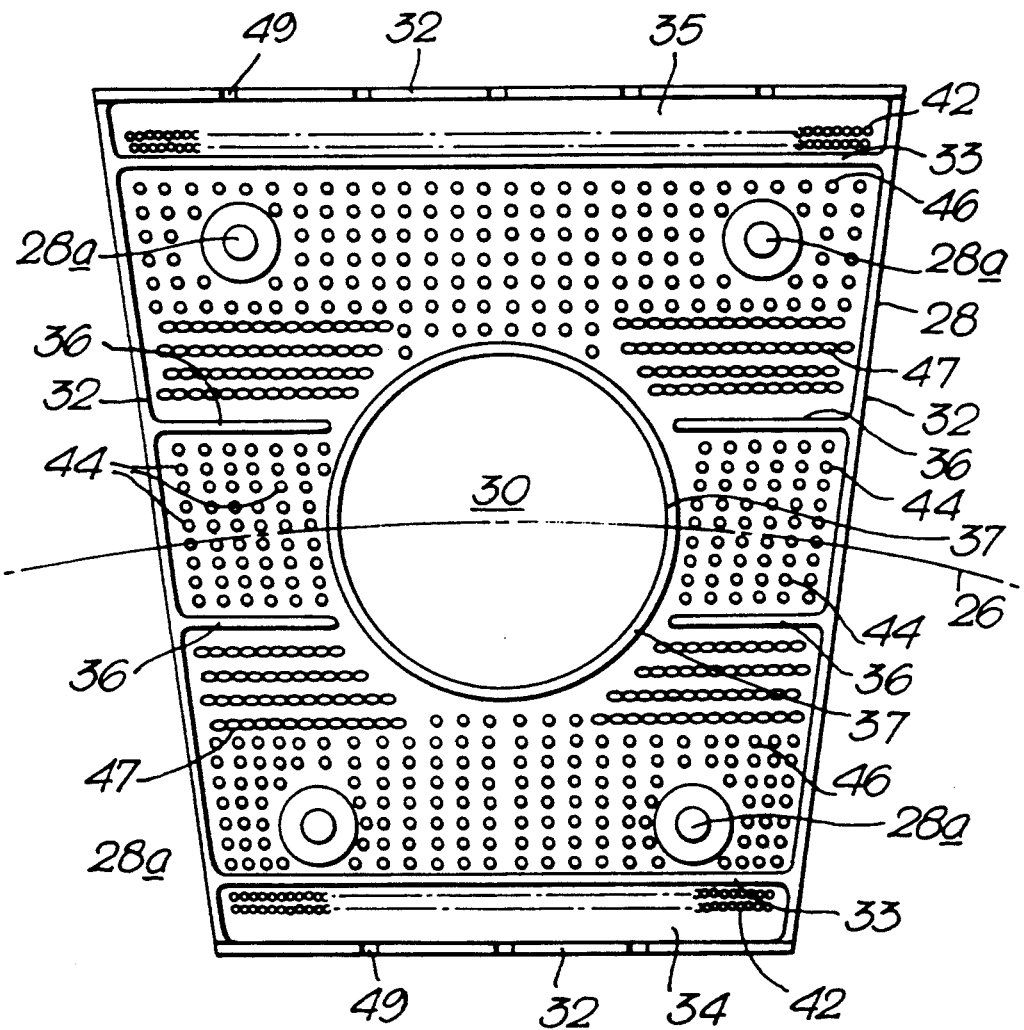
FIG. 5 is a view of the upstream face of the heat shield shown in FIG. 3.

Specifically referring to FIG. 5, the heat shield 28 is provided with a flange 32 which extends around its outer periphery, as well as flanges 33 which cooperate with the flange 32 to define circumferentially extending compartments 34 and 35 within the chamber 31 at the radially inner and outer extents respectively of the heat shield 28. The remainder of the chamber 31 is subdivided by four flanges 36 which extend circumferentially from the radially extending edges 29 of the heat shield 28 towards, but terminate short of an annular flange 37 provided around the fuel burner aperture 30.

Figure 6:
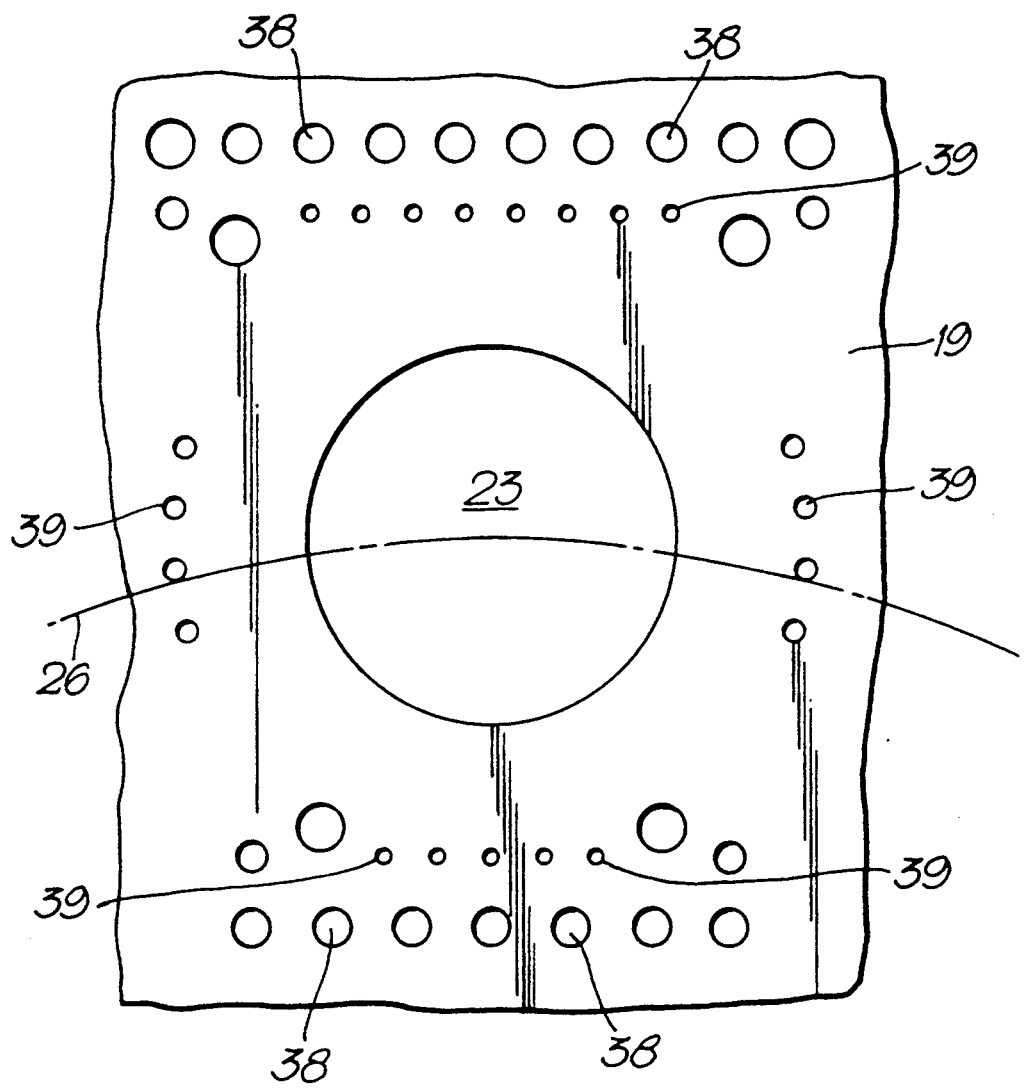
FIG. 6 is a view on arrow C of FIG. 2, the fuel burner and the seal therefor having been omitted in the interests of clarity.

Cooling air, which is part of the air flow from the air inlets 22, is directed into the chamber 31 through a plurality of apertures 38 and 39 in the bulkhead 19, as can be seen in FIG. 6. The apertures 38 are so positioned as to direct cooling air into the circumferentially extending compartments 34 and 35 whereas the apertures 39, which are of smaller diameter than the apertures 38, direct cooling air into the remaining part of the chamber 31. The cooling air passing through the apertures 38 and 39 impinges upon parts of the upstream face of the heat shield 28, thereby providing localised impingement cooling of those parts.

The portions of the heat shield 28 which partially define the compartments 34 and 35 are, as can be seen in FIG. 4 of greater depth than the remainder of the heat shield 28. This is so as to facilitate the definition of facets 40 and 41 adjacent the radially inner and outer extents respectively of the heat shield 28. Both facets 40 and 41 face the notional surface 26 and are provided with a large number of small apertures 42 through which cooling air from the compartments 34 and 35 is exhausted. The facets 40 and 41 are so angled with respect to the remainder of the heat shield 28 that the cooling air exhausted from the apertures 42 flows generally over the downstream face of the heat shield 28, thereby providing a certain amount of film cooling of that downstream face. Additional cooling apertures 49 are provided in the flange 32 portions on the radially inner and outer edges from the apertures 49 provide cooling of the radially inner and outer extents 20 and 21 respectively of the bulkhead 19.

The cooling air apertures 39 are so located in the bulkhead 19 as to direct cooling air into those regions of the chamber 31 which are adjacent the outer edges of the heat shield 28. The cooling air which enters the chamber 31 through the cooling apertures 39 adjacent the radially extending edges 29 of the heat shield 28 then flows generally towards the axially extending plane 43 which contains the longitudinal axis 25 of the fuel burner aperture 30. The cooling air is constrained to flow in this direction by the four flanges 36. Pedestals 44 provided on the upstream face of the heat shield 28 between the flanges 36 ensure that an effective heat exchange relationship is established between the cooling air flow and he heat shield 28.

The annular flange 37 around the fuel injector aperture 30 is provided with apertures 45 around its total extent. The majority of the cooling air flow constrained by the flanges 36 is exhausted from the chamber 31 through some of the apertures 45 to impinge upon the seal 27 from which the flange 37 is radially spaced apart. Consequently the cooling air flow through the apertures 39 adjacent the radially extending edges 29 of the heat shield 28 provides both convective cooling of part of the heat shield 28 and impingement cooling of part of the seal 27. The cooling air then flows into the combustor 18 where it participates in the combustion process taking place therein.

The cooling air which enters the chamber 31 through the apertures 39 adjacent the radially inner and outer edges of the heat shield 28 is constrained by the flanges 32 to flow generally towards the notional cylindrical surface 26. The cooling air flows over further pedestals 46 which are provided on the upstream face of the heat shield 28, again ensuring a good heat exchange relationship between the cooling air and the heat shield 28.

After flowing over the pedestals 46, some of the cooling air passes through the remaining apertures 45 in the circular flange 37 to impingement cool the seal 27. The remainder of the cooling air is exhausted from the chamber 31 through a plurality of film cooling holes 47 in the heat shield 28 which are located intermediate the four flanges 36 and the further pedestals 46. The cooling air exhausted from the film cooling holes 47 then proceeds to flow over the downstream face of the heat shield 28 generally towards the notional cylindrical surface 26 so as to provide film cooling of that face and subsequently take part in the combustion process taking place within the combustor 18.

It will be seen therefore that each of the heat shields 28 is extensively cooled by impingement cooling, convection cooling and film cooling. Moreover, the cooling air flows generally towards the fuel burner 24 so that the portions of the heat shields 28 which are closest to the fuel burners 24 and are usually the most difficult to cool are in fact cooled effectively.

A further advantage which is provided by the present invention is that the films of cooling air exhausted from the film cooling holes 47 tend to drive desirable recirculation within the primary upstream combustion zone within the combustor 18.

The present invention therefore makes very effective use of cooling air in that the same air is used in turn for impingement cooling and convection cooling of the heat shield 28 and either film cooling of the heat shield 28 or impingement cooling of the seal 27. The heat shield 28 therefore provide effective thermal protection of the bulkhead 19.

It may be desirable under certain circumstances to avoid film cooling of the downstream faces of the heat shields 28 by the exhaustion of cooling air through the film cooling holes 47. Under these circumstances, the cooling holes 47 could be deleted and the portions of the flanges 32 formerly adjacent the film cooling holes 47 also deleted together with part of the heat shield 28 in that area. Some of the cooling air from the chambers 31 would then, after flowing generally towards the notional cylindrical surface 26, be exhausted through gaps defined between circumferentially adjacent heat shields 28.

I claim:

1. A gas turbine engine annular combustor including a bulkhead at its upstream end, said bulkhead having a plurality of apertures therein, each aperture being adapted to receive a fuel burner, the longitudinal axes of said apertures all lying on a virtual surface if rotation, the axis of which is coaxial with the longitudinal axis of said combustor, and a plurality of heat shields located on the downstream face of said bulkhead so as to provide thermal shielding thereof, each heat shield being associated with a corresponding one of said fuel burner apertures and having a corresponding fuel burner aperture therein, means being provided to space apart each of said heat shields and said bulkhead so that corresponding chambers are defined therebetween, each said heat shield having an outer and an inner periphery, said bulkhead having a plurality of further apertures adjacent said outer peripheries of each said heat shield for the direction therethrough of cooling air into said chambers at positions adjacent said outer peripheries of each of said heat shields, means being provided to subdivide each of said chambers so that a portion of said cooling air directed into each chamber flows generally towards a plane extending parallel to and containing both the longitudinal axis of its associated fuel burner aperture and the longitudinal axis of said combustor, and the remainder flows generally toward said virtual surface, means being provided adjacent said inner peripheries to subsequently exhaust said cooling air from each of said chambers.

2. A gas turbine engine annular combustor as claimed in claim 1 wherein portions of the surfaces of said heat shields which serve to define part of said chambers are provided with pedestals thereon so as to enhance the heat exchange relationship between said heat shields and said cooling air flowing therethrough.

3. A gas turbine engine annular combustor as claimed in claim 1 wherein said virtual surface is substantially cylindrical.

4. A gas turbine annular combustor as claimed in claim 1 wherein said means provided to subsequently exhaust said cooling air from each of said chambers includes a plurality of apertures in each of said heat shields, said apertures interconnecting portions of said chambers and the downstream faces of said heat shields, and so arranged as to direct at least some of said cooling air exhausted from said chambers over at least part of said heat shield downstream faces so as to provide film cooling thereof.

5. A gas turbine engine annular combustor as claimed in claim 2 wherein said films of cooling air are directed generally towards said virtual surface.

6. A gas turbine engine annular combustor as claimed in claim 1 wherein said means provided to space apart each of said heat shields and said bulkhead are integral with one of said heat shields and said bulkhead.

7. A gas turbine engine annular combustor as claimed in claim 6 wherein said means provided to s-ace apart each of said heat shields and said bulkhead comprises a flange provided around the outer periphery of each of said heat shields, each flange additionally serving to define the peripheral extents of said chambers defined between bulkhead and heat shields.

8. A gas turbine engine annular combustor as claimed in claim 1 wherein each of said fuel burner apertures in said bulkhead is provided with a seal, said seal being arranged to be interposed between said bulkhead and the fuel burner which is operationally located in said aperture so as to provide gas seals between said fuel burners and said bulkhead while operationally permitting a limited degree of radial movement between said bulkhead and said fuel burners.

9. A gas turbine engine annular combustor as claimed in claim 8 wherein a flange is provided around said fuel burner aperture in each of said heat shields to define the inner periphery of each of said chambers, each of said flanges being radially spaced apart from the seal in the corresponding fuel burner aperture in said bulkhead.

10. A gas turbine engine annular combustor as claimed in claim 9 wherein a plurality of cooling air apertures are provided in said flanges around said heat shield fuel burner apertures, so that some of the cooling air within said chambers is exhausted through said cooling air apertures to provide cooling of said seals.

11. A gas turbine engine annular combustor as claimed in claim 10 wherein the interior of each of said chambers defined between said heat shields and said bulkhead is sub-divided by flanges so that the cooling air which provides the majority of the cooling of said seal is derived mainly from the cooling air flows within said chambers which flow generally towards said radial planes containing said fuel burner aperture axes.

12. A gas turbine engine annular combustor as claimed in claim 1 wherein opposite extents of each of said heat shields are configured as to define facets which are angled with respect to the remainder of their respective heat shields and apertured so that cooling air is exhausted from said chambers through said facet apertures to flow across the downstream faces of said heat shields.

13. A gas turbine engine annular combustor as claimed in claim 12 wherein each of said heat shields is provided with two of said facets, one located at the radially outer extent of said heat shield and the other located at the radially inner extent of said heat shield.

14. A gas turbine engine annular combustor as claimed in claim 13 wherein each of said chambers defined between said heat shields and said bulkhead is further sub-divided by flanges to define a discrete arcuately extending compartment at each of the radially inner end outer extents of each of said heat shields, means being provided to direct cooling air into said compartments, said facets serving to partially define said compartments.

15. A gas turbine engine annular combustor as claimed in claim 14 wherein each of said arcuately extending compartments has additional cooling air apertures which are so positioned as to direct cooling air from said compartments away from the radially inner and outer extents of each of said heat shields in directions normal to the longitudinal axis of said combustor to provide additional film cooling of said combustor.

* * * * *